OR 3,656,832

United States Patent
Judin

[15] 3,656,832
[45] Apr. 18, 1972

| | | |
|---|---|---|
| 3,136,310 | 6/1964 | Meltzer....................350/175 SL UX |
| 3,345,120 | 10/1967 | Palmer......................350/190 X |
| 3,288,585 | 11/1966 | Clarke.......................350/175 SL UX |

[54] MICRO-OPTICAL IMAGING APPARATUS

[72] Inventor: Herbert Judin, Huntington, N.Y.

[73] Assignee: Areoptix Technology Corporation, Plainview, Long Island, N.Y.

[22] Filed: June 3, 1970

[21] Appl. No.: 41,763

Related U.S. Application Data

[60] Continuation of Ser. No. 727,384, Feb. 26, 1968, which is a division of Ser. No. 419,512, Dec. 18, 1964, Pat. No. 3,379,832.

[52] U.S. Cl............................350/96 R, 350/96 B, 350/175 SL, 350/190
[51] Int. Cl..........................................................G02b 5/14
[58] Field of Search.............................350/96, 175 SL, 190

[56] References Cited

UNITED STATES PATENTS

3,166,623  1/1965  Waidelich, Jr. .................350/96 B

*Primary Examiner*—John K. Corbin
*Attorney*—Keith Misegades and George R. Douglas, Jr.

[57] ABSTRACT

A high speed, diffraction limited point or line forming optical system utilizing uncorrected and imperfect single element lenses which are substantially spherical, hemispherical or cylindrical in shape, or appropriate index and size, in conjunction with radiation or light waves incident at limited divergence angles upon said lens elements; by virtue of small optical path differences of focusing exit rays, a diffraction predominant effect occurs.

11 Claims, 9 Drawing Figures

INVENTOR
HERBERT JUDIN

ATTORNEYS

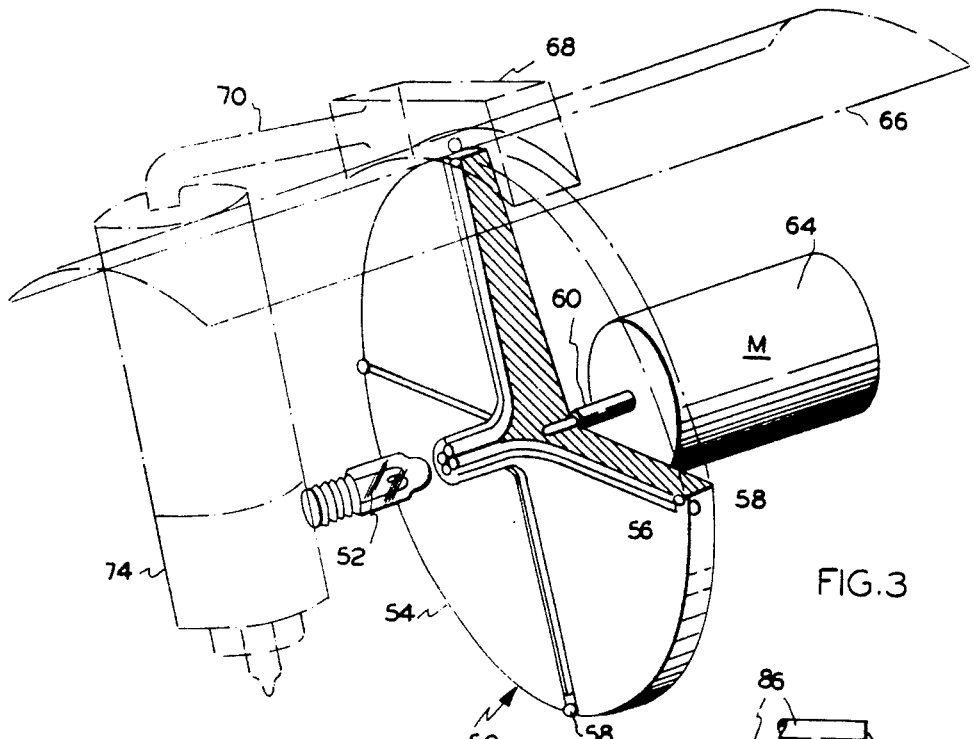
FIG.3
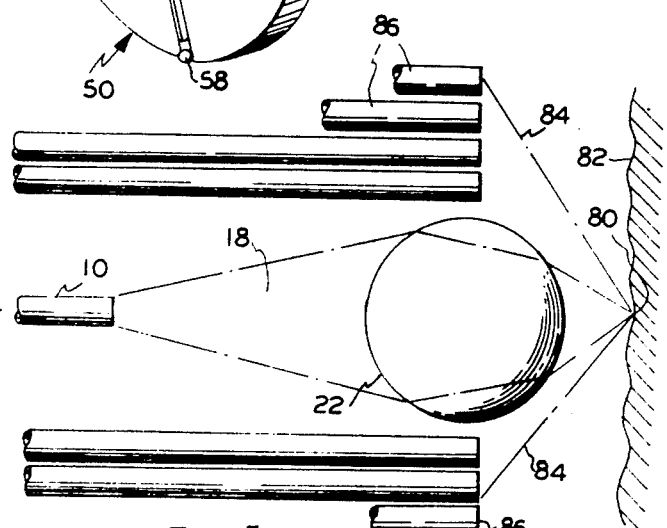
FIG.5
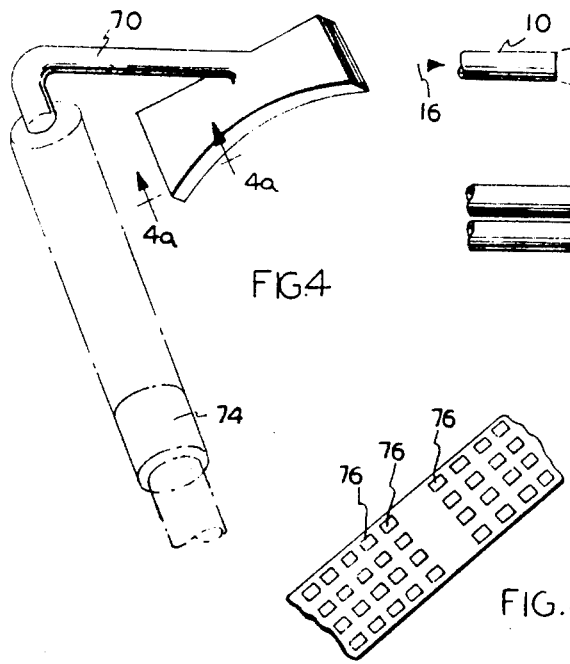
FIG.4
FIG.4A

MICRO-OPTICAL IMAGING APPARATUS

This application is a streamlined application of Ser. No. 727,384, filed Feb. 26, 1968, which is a divisional application of Ser. No. 419,512, filed Dec. 18, 1964, now U.S. Pat. No. 3,379,832 issued Apr. 23, 1968, and benefit is claimed of the filing date of the forementioned first filed application under 35 U.S.C. §§ 120 and 121 (1952).

The present invention relates to improved micro-optical scanning apparatus and more particularly relates to the method and apparatus for point light source formation, scanning and micro-probe operations.

The invention is particularly concerned with lens means disposed to primary utilization of diffraction limited production of images, such lens means receiving light from individual optical fibers disposed at the source-side of said lens means, wherein the refraction phenomena of the light passing the lens means and the lens means are of such dimensions relatively close to the wavelength of the light and disposed with the incoming ray angles approaching the paraxial region.

By means of the present invention, there is provided a method and apparatus for producing ultrafine light points of high intensity and circular symmetry. The apparatus of the invention contemplates using ordinary incandescent light, and there is produced from such light by means of the invention a control point beam approaching micron dimensions formed from optical fibers in the order of 60 microns.

It has further been found that by use of photoelectric scanning tests on film and glass media patterns with a 100 C.P.S. bandwidth system resolving powers well beyond 100 line pairs per mm. have been demonstrated. The beam forming technique of the invention is not limited by usual optical design parameters which involve the presence of both spherical and chromatic aberrations. Diffraction considerations show that sub-micron light points are possible in the practice of the present invention, thus the use of laser or other spectral sources predict resolution capabilities of over 500 line pairs per mm. Applications of embodiments of the present invention contemplate use in flying spot scanners, micro-densitometers, metallurgical studies of surface roughness or graininess, particle density, and the like, medical studies such as cytoanalysis, video recording and optical data processing including radar pulse analysis, nuclear emulsion measurements, and the invention is also applicable to the field of facsimile transmission and reception.

An object, therefore, of the present invention is to provide method and apparatus for the generation of a minute and intense symmetrical spot of light by diffraction limited means. The invention concerns the use of an optical fiber in combination with a small ball of glass acting as a diffraction limited lens. By this means, there is produced a unique light point that may be employed in any of a variety of practical applications, and the point light source of the invention approaches a 1 micron diameter, which is proximate to 0.000,040 inches in size. The fiber-ball combination of the invention may be used in a stationary state or in motion with respect to the object being scanned, whether it is a film slide, or opaque surface having attendant reflection or transmission capabilities and may be also used with beam pick-up means or photoelectric means.

In the practice of the present invention, the apparatus for producing the light point is by means of the wave aspects of diffraction rather than the usual geometric properties or ray aspects of the ball focus mechanism, and the customary need of corrective optical design measures is eliminated. The use of a substantially spherical lens is ordinarily expected to produce a light spot diameter of a few thousandths of an inch and involves the disadvantages of spherical and chromatic aberration. When a high quality ball of glass is used and where the ball is a glass sphere of sufficiently small size, the diffraction properties prevail and the resulting spot size is far less than geometrically determined. In the practice of the present invention, a glass ball need not be truly spherical within any large range of tolerance, and therefore it may be aspheric of any non-uniform curvature, and may be even egg-shaped. The glass ball need not be optically centered or in alignment with the incident beam produced from a fiber tube within any large range of tolerance. The object light source also need not be circular or symmetrical, nor need it be of homogeneous light brightness within extremely wide discrepancies. The light source used with the present invention need not be of monochromatic nature, and thus broadband white light may be used as well. The invention contemplates the use of two or more glass balls arranged in series array for producing still smaller light point diameters approaching the actual light wavelength dimension.

A further object of the invention, therefore, is to provide for the generation of unique light spots whose point forming technique is not limited by usual optical design parameters and is significantly independent of both spherical and chromatic aberrations.

Another object of the present invention is to provide means for the formation of light point sources in which glass balls or beads of various sizes up to several millimeters in diameter are provided in combination with single and multiple strand fibers of irregular cross-sections up to the order of 100 microns, and in which thereby the structural symmetry and uniformity of curvature of the balls may be ignored, even though there is produced a high quality of circular light points. The use of Gaussian relations in which there are paraxial rays for the fiber-ball system produces in accordance with the invention a solitary circular point image not accompanied by any conventional diffraction ring pattern when used with apodization.

The invention is an improvement and departure from the prior art, the prior art being primarily that which is disclosed in "Applied Optics and Optical Design." A.E. Conrady, Dover, 1957 (Vol. I) and 1960 (Vol. II); "Fiber Optics Yields a New Scanner Concept," R.G. Day and D.M. Krauss, "Controlled Engineering," Dec. 1961; U.S. Pat. No. 3,036,153 to R.G. Day; and "Ultimate Point Light Source Using Fiber Optics," H. Judin, Journal of the Optical Society of America, Vol. 54, Nov. 1964, p. 1,396, TB 16.

The above and other objects and advantages of the invention will become apparent from the full consideration of the following detailed description and accompanying drawings in which:

FIG. 3 is a partially cross-sectional view showing in perspective a preferred embodiment of the fiber-ball scanning apparatus of the present invention;

FIG. 4 shows in generally perspective arrangement an optical fiber bundle collector used in conjunction with the present invention;

FIG. 4A shows an enlarged view of a layer in cross-section taken along lines 4a—4a of FIG. 4;

FIG. 5 shows a modification of the present invention in which a coaxial arrangement of fibers and focusing glass balls provides a system using reflected and scattered light from a surface which is collected by an arrangement of peripherally disposed fibers for transporting the collected light to a photoelectric sensor;

Figure 1:
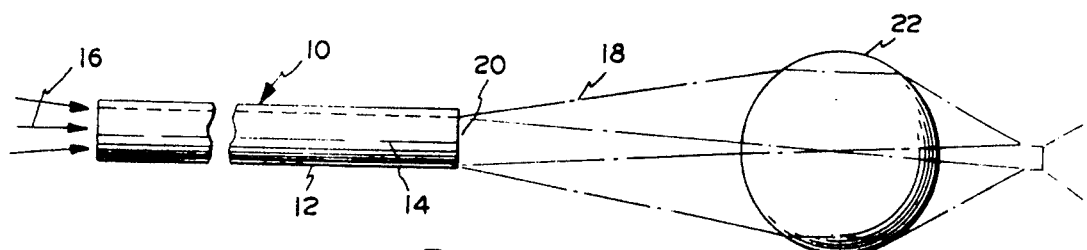
FIG. 1 is a generally schematic representation of the fiber-ball combination contemplated in the practice of the preferred embodiment of the present invention.

Referring now to the drawings, there is shown in FIG. 1, an optical fiber 10 having a clad 12 peripherally disposed about the cylindrical surface of said optical fiber, and a core 14 constructed of material for the transmission and illumination of a light beam 16 being applied thereto and for producing an exit beam 18 from the exit aperture 20. The exit beam 18 is intercepted by a small or tiny glass ball 22 of substantially spherical contour. The ball is disposed adjacent, or substantially and immediately adjacent, the exit end of the fiber 10 so that the exit beam will produce diffraction limited phenomena which predominates over the resulting refraction phenomena as a result of using imperfect, non-corrected, optical components of small dimensions, said dimensions of the components being closer to the wavelength of light dimensions with the incoming ray angles approaching the paraxial region.

Figure 1A:
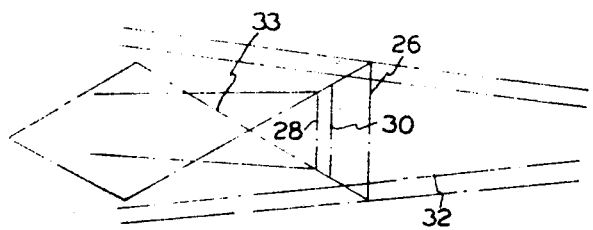
FIG. 1A is an enlarged diagram of a portion of FIG. 1.

FIG. 1A shows that the glass ball produces spherical aberration, chromatic aberration, and diffraction, so that when the glass ball 22 is above a certain size, preferably in the range of 2 to 3 mm. diameter, or even larger, then the spherical and chromatic aberrations limit the resulting light point dimensions to that shown in FIG. 1A as image 26. However, the single and simple geometrically related image size is shown as image size 28, being equal to the object size or core of fiber 14 times the image distance divided by the object distance, or I = O · Q/P. In this case, the ball acts as an aberration limited converging lens with resultant image size 26 showing a common blur circle of relative confusion.

But where the glass ball 22 is of a dimension substantially below the certain sizes described above, and not smaller than about 1 mm., and if the fiber core exit aperture 20 is beyond a certain distance separation from the ball, that is, over 3 mm. approximately, the image formed is diffraction limited and is the substantially perfectly circular image 30. Paraxially disposed rays 32 as well as marginally disposed rays 33 are also shown in FIG. 1A. A number of accompanying diffraction rings will appear in which the visible number thereof depends upon the separation distance between the exit aperture 20 and the ball 22, as well as other known factors.

Figure 2:
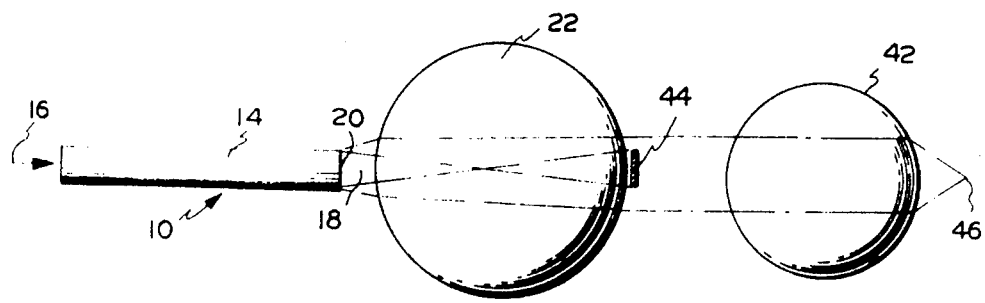
FIG. 2 is a schematic illustration and representation of a series arrangement of two glass balls in which light from a fiber element is received by the first ball and the light therefrom is collimated by a second ball, and in which a mask is used to eliminate extraneous light from being emitted further, in accordance with an embodiment of the invention.

FIG. 2 is an embodiment in which there is provided an arrangement of two glass balls 22,42 in series alignment along the paraxial axis, and in which the first ball 22 acts as a collimator, while the ball 22 20 has a mask over and adjacent the central portion of the beam. Said mask 44 is disposed to shield the extraneous light from further transmission. The lateral portions of the ball 22, taken with respect to the axis provided by the passage of the beam therethrough, may also be shielded so that extraneous light is not emitted therefrom. Gaussian conditions are thus produced so that it is possible to obtain a finer point light source. Thus a small angular divergence of the incident light is passed onto ball 42. Thus a light source of beam 16 provides for the transmission of light to the fiber 14, whose exit core aperture 20 is placed at or near the focal point of ball 22, and the fiber 14 is also clad or shielded, as described in connection with FIG. 1.

The final point image 46 of the beam transmitted from ball 42 is substantially devoid of rings when apodization is applied and approaches being a true point light source with dimensions in the order of the wavelength of the light used. This is a Gaussian image point as produced by imperfect optical elements which are diffraction limited rather than geometrically limited, that is by diffraction rather than refraction phenomena. It is noted that use of apodization techniques may be employed to increase light concentration of central image pattern, effectively limiting the formation of Airy ring patterns.

There is shown a more particular embodiment and application of the principles of the invention in FIG. 3, and the fiber-ball scanning arrangement 50 is provided to include a lens lamp source 52, a rotating disc or element 54 in which are mounted a plurality of single fiber elements 56 that terminate at peripheral portions of the disc so that the light from the fiber elements 56 pass through minute glass balls 58,58. The disc 54 is mounted on an axis 60 for rotation by a motor 64 that is separately energized (not shown).

Over a portion of the peripheral surface of the disc 54 is a film 66 that moves along its longitudinal direction so that as the disc 54 rotates, the light passing from the lamp 52 and as transmitted by the fiber elements 56 and the balls 58,58 respectively, scan and provide modulation of the light beam as it passes through the film 66 and is received by an optical fiber bundle collector 68. The collector 68 is more particularly shown in FIGS. 4 and 4A, and contains multiple layers of fiber objects and consequently the light received in the collector is accordingly translated over collector means 70 so that a multiplier phototube 74 receives and amplifies the light that is applied thereto. FIG. 4A shows that there may be a multiplicity of fiber ends 76, 76,76, that are disposed for receiving the light as it is modulated and received after passing the film 66.

In FIG. 5, there is shown an arrangement in which light 16 from a source is applied to a fiber element 10 to produce exit beam 18 which is applied to a glass ball or diffraction limited lens means 22, to produce therefrom a substantially point image 80, as has been previously described herein. The point 80 is applied to a specimen surface 82 that tends to reflect and scatter light as shown in beams 84,84, so that they are received and collected by an arrangement of concentric fibers 86,86, circumferentially arranged about glass fiber 10 and are coaxial or substantially coaxial therewith. The exit ends of the fibers 86,86 direct the exit beam onto a photoelectric sensor element (not shown).

Figures 6, 7A:
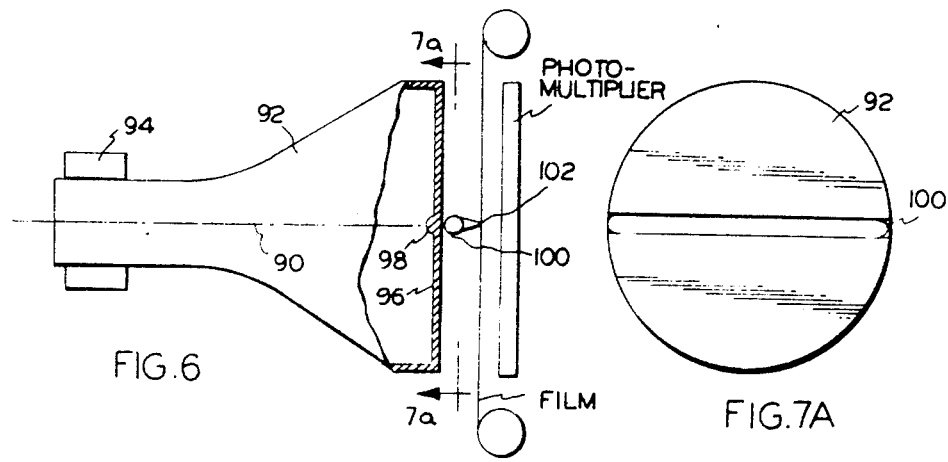
FIG. 6 is a schematic representation of a modification of the invention in which a cathode ray tube is provided with a phosphor coated glass element in conjunction with a glass fiber to provide a diffraction limited effect upon an image receiving means, in accordance with another modification of the invention.

There is shown a further embodiment in FIG. 6 in which a cathode ray tube is provided as a translative element for a beam 90, the cathode ray tube 92 having the conventional yoke 94 for deflecting the beam or rotating it, as is well known. The beam is received by a screen 96 which contains a phosphor coated glass body of curving section, as shown, of about 25 to 50 microns (0.025 to 0.050 mm), as a radius of curvature in the vacuum side of the screen 96. It is positioned in alignment with a glass fiber 100 in which no clad is used, such clad having been exemplified in FIGS. 1 and 2, and the glass fiber is of 0.75 mm radius of curvature and is secured or cemented to the outside portion of the cathode ray tube along a given diameter thereof. The beam 90 is controlled to translate by the yoke 94 and attending circuitry thereto (not shown) to provide a linear scan across the glass section 98 so that the light output collected by the fiber 100 is diffraction limited by the lens effect thereof and is collected at a point 102.

It is within the contemplation of the present invention to provide an arrangement of a plurality of fibers so that the exit beams thereof are directed to a common glass ball, and by this arrangement the same diffraction limited effect appears, and the light point spot appears in different planes, so that it is possible to provide an arrangement wherein the light point spots are disposed in perpendicular arranged planes which may be identified as the XY plane, the XZ plane, and the YZ plane.

The fiber-ball technique of the present invention may be found to take place of conventional expensive, highly corrected, bulky and critical aligned microscope objectives in providing axial point light sources. It is also within the scope of the present invention to use half balls of glass instead of the spherical glass elements, and where such half balls are used, the hemisphere is arranged such that the diametrical plane receives the light, and the curved surface thereof provides the exit plane for the light beam passing therethrough.

The invention is capable of being applied to video and sound recording systems, high density computer storage, printing plate manufacture for use in Laser systems, and other related and developmental systems.

Additional and further embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. Method of forming an image having at least one micropoint comprising passing radiation from an optical fiber source through an optically uncorrected converging aspherical lens, and producing a diffraction limited image, said lens being placed about 3 mm or more from the fiber source and the lens having a diameter in the range of 1 to about 3 mm in its major axis.

2. The invention according to claim 1 wherein said step of passing radiation includes passing radiation through said uncorrected lens formed of a series of two substantially spherical ball elements, the first element being a beam divergence reducer for the succeeding element.

3. The invention according to claim 2 wherein said step of passing radiation includes passing radiation through said first element in the form of a spherical section of ball, said ball section receiving incident radiation emanating from the vicinity of its aplanatic point.

4. The invention according to claim 1 wherein said step of passing radiation includes passing radiation through a mask disposed in optical beam path of said radiation.

5. Method of forming an image having at least one micropoint of light according to the invention of claim 1 wherein said step of passing radiation includes passing radiation through said lens of single-element construction.

6. Method of image forming in an optical system according to the invention of claim 1, wherein said step of passing radiation includes passing radiation through said lens of an appropriate size and index of refraction, which lens receives incident radiation within a limited beam divergence angle to form a diffraction predominate image.

7. Method of line-image forming for an optical system according to the invention of claim 1, wherein said step of passing radiation includes passing radiation through said lens constructed of a single material element, of a substantially cylindrical shape and with appropriate cross-sectional dimensions and index of refraction; said lens receiving radiation from a line of light object and producing a diffraction predominate line image.

8. Method of providing a controllable size point image which is diffraction limited comprising passing radiation beam from an optical fiber source through an optically uncorrected converging lens, said lens being a plano-convex optical element, said lens being placed about 3 mm or more from the fiber source and having twice the radius of curvature of the convex surface being in the range of 1 to about 3 mm.

9. Method of controllable size point image-forming of light according to claim 2, wherein said step of passing radiation includes passing radiation through said lens of hemispherical single-element construction.

10. Method of producing a fine point image for a surface probing or scanning device comprising passing radiation from an optical fiber source through a substantially spherical ball element being a diffraction limited uncorrected converging lens, said ball element being placed about 3 mm or more from the fiber source and having a diameter in the range of 1 to about 3 mm.

11. Method of surface probing or scanning for an optical system according to claim 3, wherein said ball is of a single material construction.

* * * * *